Figure 1:
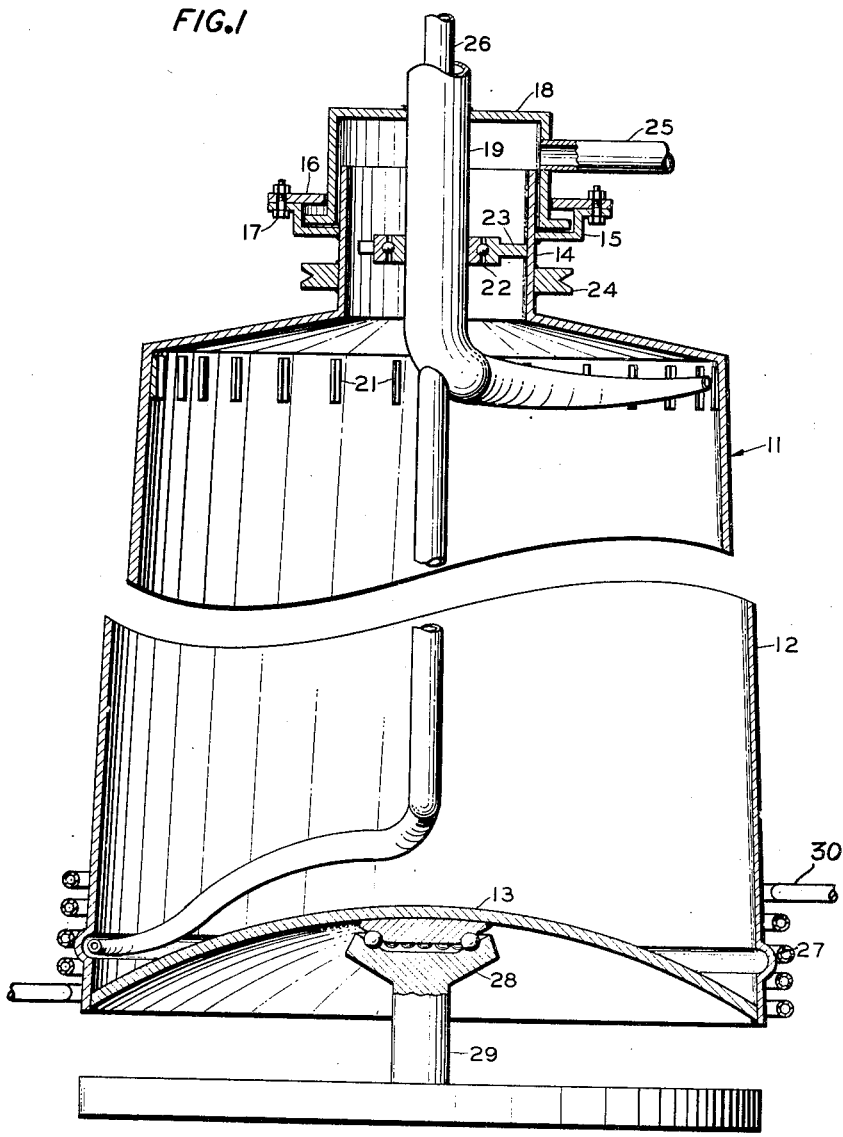

April 24, 1951  K. H. HACHMUTH  2,549,968
MEANS AND METHOD FOR SELECTIVE LOW-PRESSURE
DESORPTION OF LIQUIDS
Filed July 30, 1948  2 Sheets-Sheet 2

INVENTOR.
K. H. HACHMUTH
BY Hudson and Young
ATTORNEYS

Patented Apr. 24, 1951

2,549,968

UNITED STATES PATENT OFFICE 2,549,968

MEANS AND METHOD FOR SELECTIVE LOW-PRESSURE DESORPTION OF LIQUIDS

Karl H. Hachmuth, Bartlesville, Okla., assignor to Phillips Petroleum Company, a corporation of Delaware Application July 30, 1948, Serial No. 41,427

12 Claims. (Cl. 233—13)

This invention relates to an absorption system. In one of its more specific aspects it relates to a low pressure desorption device. In another of its more specific aspects it relates to an improved method of desorbing absorption liquids. In another of its more specific aspects it relates to the separation of hydrogen from gas mixtures.

Selected gaseous materials, such as hydrogen, may be separated from gaseous mixtures consisting of the selected gas and other gaseous materials by either absorbing the selected gaseous material or the other gaseous materials in a suitable absorbent liquid. Mineral seal oil has been suitably used as one of such absorption liquids for such a separation in a multi-step countercurrent absorption unit. The amount of absorption liquid required for the absorption of such gaseous material is quite great when compared to other absorption processes. Mineral seal oil, which is conventionally used for the absorption of gaseous hydrocarbons, must be stripped of gaseous materials before being returned to the absorption chamber. Stripping, herein used interchangeably with "desorption," of the absorption liquid cannot be carried on economically at the high pressure at which the absorption step is accomplished. It has therefore been necessary to reduce the pressure on the mineral seal oil before stripping the gaseous hydrocarbons therefrom. The energy which is required to place the stripped mineral seal oil under pressure once again has heretofore made the process relatively uneconomical.

Since energy is an abstract quantity and not easily measurable it is most conveniently thought of in relation to the simple measurements, such as pressure, height, velocity, etc., by which its existence is indicated. In order that all these forms of energy may be algebraically added it is customary to express them all, in discussions of hydraulics, in terms of "head" expressed in feet of liquid depth. Thus are derived the terms "pressure - head," "velocity - head," "friction - head," etc., and it is in this sense that these terms are employed in the following specification and claims to represent their respective forms of energy.

An object of the invention is to provide an improved stripping device. Another object of the invention is to provide an improved absorption system. Another object of the invention is to provide an improved method of stripping gaseous material from an absorption liquid at low pressures in a high pressure absorption system. Another object of the invention is to conserve the mechanical energy stored in the absorption liquid drawn from the absorption chamber. Other and further objects and advantages will be obvious to those skilled in the art upon study of the acompanying disclosure.

Figure 2:
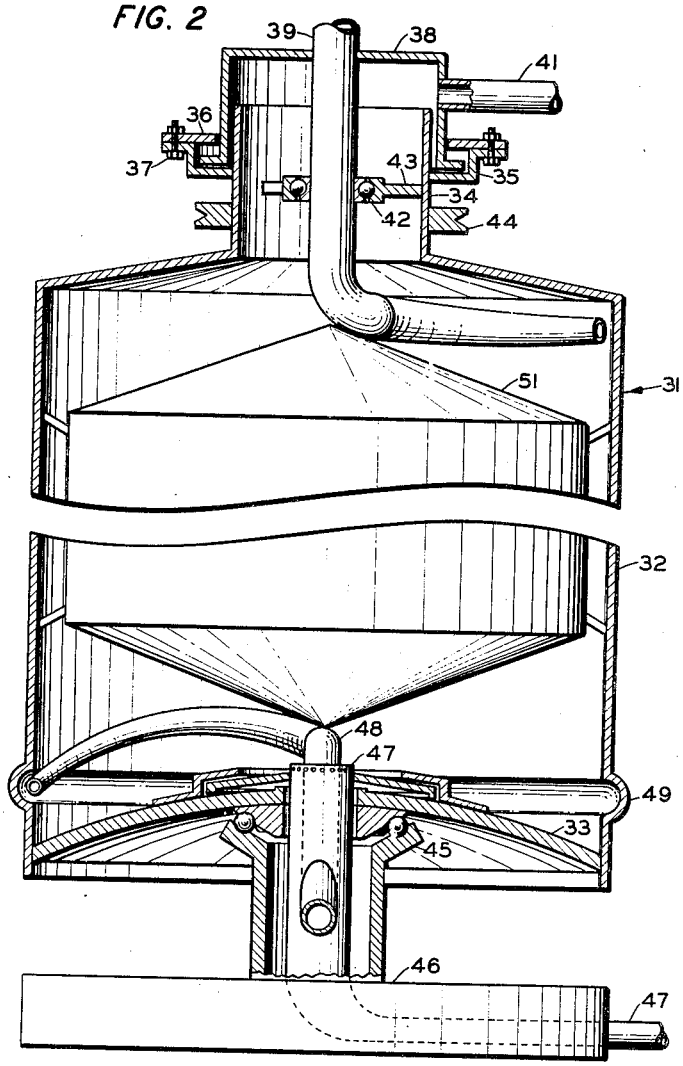
Figure 3:
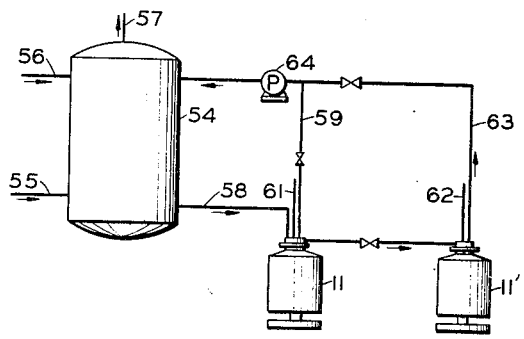

Understanding of the invention will be facilitated upon reference to the drawings, in which Figure 1 is a sectional elevation of the device embodying the preferred form of the invention. Figure 2 is also a sectional elevation of a device which discloses a modification of the invention. Figure 3 is a diagrammatic flow diagram of the absorption system of this invention.

In Figure 1, rotary desorption chamber 11 comprises an elongated shell 12 which is closed in its lower end by concave closure member 13 and is provided with an outlet throat 14 in its opposite end. Closure member 13 may be either concave, convex or flat as desired. Surrounding the upper portion of outlet throat 14 is a liquid container 15 which is partially closed at its upper end by annular plate 16 which is removably affixed to container 15 by bolt members 17. Cap member 18, which is closed at one of its ends and open at the other end, is provided with a flange which is preferably outwardly turned at its open end. The flanged end of cap 18 is inserted into container 15, which contains a sealing liquid, and is enclosed therein by rigidly fastening member 16 to container 15. Absorption liquid inlet conduit 19 extends through the closed end of cap 18, axially into outlet throat 14 of chamber 12, and extends as a progressively restricted volute to its outlet end adjacent the upper wall portion of chamber 12. Affixed on the interior of chamber 12 in substantially the same horizontal plane as the outlet end of the volute are a plurality of ridge members 21. Bearing member 22 is provided around inlet conduit 19 within outlet throat 14 and is supported by spider arms 23 which extend outwardly and are connected to throat 14 of chamber 12. A pulley member 24 is provided about and rigidly affixed to outlet throat 14. Effluent outlet conduit 25 extends from the upper portion of cap 18. Absorbent liquid outlet conduit 26 extends from an inlet end adjacent a lower wall portion of chamber 12 as an expanding volute inwardly toward the axis of said chamber and upwardly through outlet throat 14 and cap 18. Conduit 26 preferably extends coaxially with inlet conduit 19. An expanded section 27 is provided in the lower portion of shell 12 and the inlet end of outlet conduit 26 preferably extends into that expanded section. Bearing member 28 is affixed on support member 29 so as to rotatably support shell 12. Shell 12 may be either an elongated cylinder or may have sidewalls which extend downwardly and outwardly from the upper to the lower end.

In Figure 2, rotary desorption chamber 31 comprises elongated shell 32 which is closed at its lower end by concave closure member 33 and is provided with effluent outlet throat 34 in its upper end. Liquid container 35 is attached to the upper end of throat 34 and is partially closed by annular ring member 36 which is rigidly fixed in place by bolt members 37. Cap member 38 is closed at one end and is open at the other end. Member 38 is provided with an outwardly turned flange at its open end. The flanged end of member 38 is inserted into and enclosed in container 35, which contains a sealing liquid, by rigidly fastening member 36 to container 35. Absorption liquid conduit 39 is provided so as to extend substantially coaxially through the closed end of cap member 38 and through throat 34 and as a progressively restricted volute outwardly and downwardly to a point adjacent the upper wall portion of shell 32. Effluent outlet conduit 41 is provided to communicate between cap member 38 and an effluent disposal point. Bearing member 42 is affixed to conduit member 39 within throat 34 and is supported by spider arms 43 extending to and affixed to throat 34. Pulley member 44 is disposed on and rigidly affixed to throat 34 so as to allow connection for a drive member 34 so as to allow connection for a drive means, such as a motor, by means of a belt or a chain. Shell 32 is supported by bearing member 45 which in turn is supported by support member 46. Stripping gas inlet conduit 47 extends through said support member and upwardly into the chamber formed within shell 32. Absorption liquid outlet conduit 48 extends as a progressively expanding volute from a point adjacent the lower wall portion of shell 32, preferably enlarged portion 49, inwardly toward the axis of shell 32 and downwardly through conduit 47 to a liquid disposal point. Conduit member 47 is open, preferably by perforations in its upper end, so as to allow the passage of stripping gas therefrom. A gas-tight seal similar to that used in the upper end of the shell is provided about the outlet and stripping gas conduits so as to seal the chamber. Baffle member 51 is provided within shell 32 and is supported by spider arms extending between baffle member 51 and shell 32. Shell 32 may be an elongated cylinder as shown in Figure 2, or may be provided with gradually sloping sides which slope outwardly and downwardly toward its lower end.

In the operation of the device shown in Figure 1, shell 12 is rotated by driving means in operative communication with pulley member 24. When shell 12 has been brought to the proper speed of rotation, gas-rich absorption liquid is injected through conduit member 19 into the interior of shell 12. The gas-rich absorption liquid is maintained at a high pressure similar to that at which the absorption step was accomplished. As the liquid flows through conduit 19, it becomes progressively restricted as it moves toward the circumference of shell 12. In that manner, the velocity of liquid flow is increased and the pressure is decreased. The liquid flows from the constricted end of conduit 19 against rib members 21, thereby adding propelling force to the rotation of shell 12. The optimum speed of rotation of shell 12 is that speed which will correspond to the velocity of liquid flow from conduit member 19 against the wall of shell 12.

The high pressure-head of the absorption liquid is thus converted into velocity-head, and only a very minor portion of the total energy content of the liquid is lost in making the transition from the high pressure zone to the low pressure zone. The liquid forms a thin layer on the side of the shell, being held against the shell by centrifugal force, and flows downwardly by gravity. Pressure within the desorption chamber is maintained under little or no vacuum and preferably above atmospheric pressure. The selected pressure within the desorption chamber will depend upon the pressure at which the adsorption liquid is maintained prior to passage through the constricted volute into the desorption chamber and upon the pressure drop required to obtain satisfactory desorption of the gases involved. As the gaseous material is separated from the absorption liquid, it passes upwardly through outlet throat 14 and through outlet conduit 25. The denuded absorption liquid flows downwardly along the shell wall and is picked up in the expanded shell portion by the inlet end of absorption liquid outlet conduit 26 which is progressively expanded as it extends as a volute inwardly toward the center of shell 12. In this manner the velocity-head of the liquid is converted to pressure-head. In conduit 26 the liquid under the increased pressure flows upwardly through liquid outlet conduit 26 to a liquid disposal point.

The operation of the desorption device shown in Figure 2 is similar to that shown in Figure 1 with certain exceptions. The gas-rich absorption liquid is inserted into shell 32 after the shell has been brought to the desired rate of rotation, similarly as in the operation of the device of Figure 1. Stripping gas is inserted through the bottom of shell 32 through conduit member 47 and is directed outwardly and upwardly across the surface of the desorption liquid flowing downwardly along the wall of shell 32. The presence of the stripping gas reduces, in the atmosphere above the surface of the liquid, the partial pressure of the gas being desorbed and thereby encourages the desorption. The stripping gas and the released gaseous material flows upwardly through outlet throat 34 and outlet conduit 41. Downwardly flowing liquid is picked up by the inlet end of liquid outlet conduit 48 in which the velocity-head of the liquid is converted to pressure-head. The absorption liquid, at high pressure, flows downwardly and outwardly through conduit 48 to a liquid disposal point.

In the system shown diagrammatically in Figure 3, a gaseous mixture is injected into absorption chamber 54 through gaseous inlet conduit 55 at its lower portion. Denuded absorption liquid is injected into the upper portion of absorption chamber 54 through liquid inlet conduit 56 and flows downwardly therethrough countercurrent to the flow of gaseous material flowing upwardly through chamber 54. High pressure absorption may be carried on within chamber 54 at between 300 and 2500 p. s. i. a. It is preferred in many separations to maintain the absorption chamber at between 800 p. s. i. a. and 1200 p. s. i. a. At least one of the gaseous materials is selectively separated from the gaseous mixture either by absorption in the selected absorption liquid or by the absorption of the other constituents of the gas mixture in the absorption liquid. Gaseous effluent is removed from chamber 54 through effluent outlet conduit 57. Gas-rich absorption liquid is removed from the lower portion of chamber 54 through conduit 58 and is passed through a first rotary desorption chamber 11 which is maintained at a pressure which will selectively remove the desired gas from the absorption liquid. The pressure within the desorption chamber may be maintained at a pressure between 1 p. s. i. a. and 250 p. s. i. a. Generally a pressure between 3 p. s. i. a. and 100 p. s. i. a. is preferred in the desorption chamber. If only one gaseous material was absorbed in the absorption liquid, the denuded absorption liquid is recycled to chamber 54 through conduit member 59. Gaseous material which is removed from the absorption liquid is removed from chamber 11 through effluent outlet conduit 61. If a second gaseous material was absorbed by the absorption liquid and its selected separation is desired, the absorption liquid containing that gas fraction may be passed through rotary desorption chamber 11'. The gas is removed through effluent outlet conduit 62 and the denuded absorption liquid is recycled to chamber 54 through conduit 63. Pump 64 may be inserted in the recycle conduit if the pressure of the liquid leaving chambers 11 and 11' is not high enough for injection into absorption chamber 54. Pressure-efficiency of the desorber may be maintained by applying power thereto by an external rotation drive means.

The rotating shell of chambers 11 and 31 may be made either of steel, aluminum, or other high-tensile strength material. Pressure differentials as high as 2000 or more pounds per square inch may be maintained between the absorber chamber and the rotary desorption chamber. The pressure drop between the unrestricted inlet to the constricted volute and the desorption chamber may be fixed within a range of from 250 p. s. i. a. to 2250 p. s. i. a. It is necessary to the efficient operation of the desorption system that the desorption chamber be maintained at a constant speed of rotation for a given pressure differential between the absorption and desorption chambers. Using a desorption chamber having a diameter of two feet and maintaining a pressure differential between the absorption and desorption chambers of 165 pounds per square inch, the desorption chamber should be rotated at a speed of approximately 1800 R. P. M. The speed of rotation of the desorption chamber for a pressure differential of 660 pounds per square inch should be approximately 3600 R. P. M., and for a pressure differential of 1000 pounds per square inch a speed of approximately 4435 R. P. M. A desorption chamber of any diameter may be utilized as long as the speed of rotation is regulated so as to give a peripheral velocity equal to that of the liquid emerging from the inlet nozzle.

*Specific example*

A feed stream consisting of fifty pounds mols hydrogen, and fifty pounds mols methane is injected into the lower portion of a multi-tray absorber operating at 1000 p. s. i. a. Four-hundred and eighty mols of lean absorption oil are injected at the top of the absorber. A residue gas consisting of nearly pure hydrogen, 36 mols of hydrogen and 1 mole of methane, is removed from the top of the absorber. The gas-rich oil is removed from the lower part of the absorber and is passed to a rotating separator having a diameter of two feet. Pressure within the separator is maintained at approximately 15 p. s. i. a. and the separator is rotated at approximately 4400 R. P. M. Forty-nine mols of methane and 14 mols of hydrogen are removed from the upper end of the separator. Denuded oil is removed from the bottom of the separator at approximately 1000 p. s. i. a. and is recycled to the upper end of the absorber.

Other gas mixtures may also be separated in the device of this invention. An example of another gas mixture which may be separated in this manner is carbondioxide from hydrogen, using water as the absorbent liquid.

Many other modifications may be made of this invention. If desired, the desorption chamber may be placed in a horizontal position. If the desorption chamber is placed in a horizontal position, it is desired that its diameter increase slightly from the inlet end to the outlet end in order to insure flow of liquid in that direction. In all cases the rotation of the shell should be in the direction of absorption liquid flow into the shell.

Proper design of the volute is very important to the operation of the invention. It is desirable to avoid all sudden changes in the direction of flow within the volute. Sudden changes in direction of flow within the volute cause considerable energy loss by turbulence and pressure drop through the volute. Another feature which may be utilized to aid in the release of gaseous material from the rotating absorption chamber is a radiant or other type heating means, such as heating coils 30 adjacent the wall of the desorption chamber of Fig. 1 which will raise the temperature of the desorption chamber, thus encouraging release of gas therein.

As will be evident to those skilled in the art, various modifications of this invention can be made or followed in the light of the foregoing disclosure and discussion without departing from the spirit or scope of the disclosure.

I claim:

1. A method of selective recovery of gases which comprises the steps of passing a gas rich absorption liquid, which is maintained under high pressure, from an absorption zone through a progressively restricted constriction zone; discharging said liquid outwardly against the periphery of a rotating, low-pressure, centrifuge desorption zone, whereby the pressure-head of the liquid is converted into velocity-head and at least a portion of said absorbed gaseous material is released from said absorption liquid; removing resulting denuded liquid from the periphery of said centrifuge zone; passing said liquid in a helical path inwardly through a progressively enlarged collection zone toward the axis of said desorption zone, wherein said velocity-head is converted to pressure-head; and removing said released gaseous material from said centrifuge zone.

2. The method of claim 1, wherein said denuded liquid is similarly passed through at least one subsequent centrifuge desorption zone which is maintained at a considerably lower pressure than the immediately preceding desorption zone, whereby successively lower vapor pressure gaseous materials are desorbed from said absorption liquid; and recycling said denuded liquid from the last said desorption zone to said absorption zone.

3. The method of claim 1, wherein a stripping gas is injected into said desorption zone and passed counter-currently along the surface of said liquid at the periphery of said desorption zone, whereby the desorption of gaseous material is encouraged; and withdrawing said stripping gas from said desorption zone.

4. A method of selective recovery of gases which comprises the steps of passing a gas-rich liquid, which is maintained at a pressure between 300 p. s. i. a. and 2500 p. s. i. a., from an absorption zone through a progressively restricted constriction zone; discharging said liquid outwardly against the periphery of a centrifuge desorption zone which is maintained at a pressure between 1 and 250 p. s. i. a.; rotating said desorption zone, whereby the pressure-head of said liquid is converted to velocity-head and said absorbed gaseous material is released from said liquid; removing resulting denuded liquid from the periphery of said centrifuge zone, passing said liquid inwardly and downwardly through a progressively enlarged collection zone, wherein said velocity-head is converted to pressure-head; recycling said denuded liquid to said absorption zone; and removing said released gaseous material from said centrifuge zone.

5. The method of claim 4, wherein a pressure drop between the unrestricted inlet to said restricted constriction zone and said desorption zone is fixed within a range of from 250 p. s. i. a. to 2250 p. s. i. a.

6. A method of selective recovery of gases which comprises the steps of passing a methane-rich mineral seal oil, which is maintained at a pressure between 800 p. s. i. a. and 1200 p. s. i. a., from said absorption zone through a progressively restricted constriction zone downwardly and outwardly against the outer periphery of a centrifuge desorption zone which is maintained at a pressure between 3 p. s. i. a. and 100 p. s. i. a.; rotating said desorption zone, whereby the pressure-head of said liquid is converted into velocity-head and said absorbed methane is released from said oil at the reduced pressure therein; removing resulting denuded oil from the periphery of said centrifuge zone, passing said oil inwardly and downwardly through a progressively enlarged collection zone, wherein said velocity-head is converted to pressure-head; recycling said denuded oil to said absorption zone; and removing said released gaseous material from said centrifuge zone.

7. A rotary low pressure desorption device comprising in combination an elongated, substantially vertically disposed shell having an axial opening in its upper and lower ends; a stationary liquid inlet conduit extending through the opening in the upper end of said shell, that portion of said inlet conduit within said shell being shaped as a volute which is gradually restricted to its outlet end and extends to a point adjacent the wall of said shell; a stationary effluent outlet extending upwardly from said opening in the upper end of said shell; a stationary liquid outlet extending inwardly and downwardly through the opening in the bottom of said shell, that portion of said outlet conduit within said shell being shaped as a volute which is gradually enlarged toward its outlet end and which conduit extends from a point adjacent the wall of said shell; gas-tight seal means closing said axial openings in said shell about said conduits in such manner as to leave said shell free to rotate; and rotation means to rotate said shell about said conduits.

8. The desorption device of claim 7, wherein said rotation means comprises longitudinal ridges on said shell wall adjacent said outlet end of said liquid inlet and disposed in the path of liquid flow from said liquid inlet conduit.

9. A rotary low pressure desorption device comprising in combination an elongated rotatable shell; a stationary liquid inlet conduit extending centrally into the upper end of said shell, that portion of said inlet conduit within said shell being shaped as a progressively restricted volute and extending to a point adjacent the upper portion of the wall of said shell; a stationary liquid outlet conduit having an inlet end adjacent the lower wall portion of said shell, said conduit extending as a progressively enlarged volute inwardly to substantially the axis of said shell and extending centrally out through one end of said shell to a liquid disposal; a stationary effluent outlet in the upper end of said shell; and at least one liquid seal means closing said shell around said inlet and outlet conduits.

10. The desorption device of claim 9, wherein said shell is progressively larger from one of its ends to the other.

11. The desorption device of claim 9, wherein an expanded section is provided in the periphery of said shell near its lower end; and said stationary liquid outlet conduit extends from within said expanded section.

12. A centrifuge desorption device which comprises in combination an elongated, substantially vertically disposed shell having an axial opening in its upper end closure; bearing means externally disposed on said shell, whereon said shell may be rotated; a first stationary conduit extending through the opening in said upper closure, that portion of said conduit within said shell being shaped as a first volute which is progressively restricted toward its outlet end, said outlet end being adjacent the wall of said shell; a stationary effluent outlet extending upwardly from said opening in the upper end of said shell; a second stationary conduit extending through the opening in said lower closure, that portion of said conduit within said shell being shaped as a second volute which spirals in a direction opposite to that of said first volute in the upper portion of said shell, the inlet end of said second volute being adjacent the lower wall portion of said shell, said second volute being progressively enlarged from its inlet end; liquid seal means closing said openings in said end closures, whereby said rotatable shell is closed to the atmosphere; and rotation means adapted so as to rotate said shell.

KARL H. HACHMUTH.

REFERENCES CITED

The following references are of record in the file of this patent:

UNITED STATES PATENTS

| Number | Name | Date |
|---|---|---|
| 1,119,176 | Kopke | Dec. 1, 1914 |
| 1,934,029 | Asbury | Nov. 7, 1933 |
| 2,182,862 | Allardice | Dec. 12, 1939 |
| 2,216,939 | Dodge | Oct. 8, 1940 |
| 2,294,214 | Seinfeld | Aug. 25, 1942 |
| 2,435,941 | Jones | Feb. 10, 1948 |